United States Patent
Jin et al.

(10) Patent No.: US 7,865,587 B1
(45) Date of Patent: Jan. 4, 2011

(54) SYSTEM AND METHOD FOR REASSIGNING PORT NAMES ON STORAGE CONTROLLER TO MINIMIZE HOST TRAFFIC DISRUPTION

(75) Inventors: Tao Jin, Durham, NC (US); Raj Lalsangi, Cary, NC (US)

(73) Assignee: NetApp, Inc., Sunnyvale, CA (US)

( * ) Notice: Subject to any disclaimer, the term of this patent is extended or adjusted under 35 U.S.C. 154(b) by 205 days.

(21) Appl. No.: 12/111,838

(22) Filed: Apr. 29, 2008

(51) Int. Cl.
*G06F 15/173* (2006.01)
*G06F 11/00* (2006.01)
*G06F 13/00* (2006.01)

(52) U.S. Cl. .......................... 709/223; 714/5; 711/114

(58) Field of Classification Search ....................... None
See application file for complete search history.

(56) References Cited

U.S. PATENT DOCUMENTS

| | | | |
|---|---|---|---|
| 7,222,172 B2 * | 5/2007 | Arakawa et al. ............. 709/224 |
| 7,260,737 B1 * | 8/2007 | Lent et al. ....................... 714/5 |
| 2002/0147802 A1 * | 10/2002 | Murotani et al. ............ 709/223 |
| 2004/0054866 A1 * | 3/2004 | Blumenau et al. ............ 711/202 |
| 2005/0120160 A1 * | 6/2005 | Plouffe et al. .................. 711/1 |
| 2006/0114917 A1 * | 6/2006 | Raisch ....................... 370/401 |

* cited by examiner

*Primary Examiner*—Wen-Tai Lin
(74) *Attorney, Agent, or Firm*—Zilka-Kotab, PC

(57) ABSTRACT

A system and method are provided for reassigning port names to ports (e.g. Fibre Channel ports, etc.). This is accomplished by allowing for user involvement during the port name assignment process. By this feature, port names may be assigned and reassigned, as desired, without re-wiring cables or re-configuring storage network so that disruption to host traffic can be minimized. To this end, in various embodiments, the port names are capable of being maintained in a consistent manner after replacement of such hardware, by appropriately reassigning the port names, etc.

20 Claims, 7 Drawing Sheets

SYSTEM AND METHOD FOR REASSIGNING PORT NAMES ON STORAGE CONTROLLER TO MINIMIZE HOST TRAFFIC DISRUPTION

FIELD OF THE INVENTION

The present invention relates to storage systems, and more particularly to managing port name assignments.

BACKGROUND

A storage server is a special purpose processing system used to store and retrieve data on behalf of one or more clients. A storage controller in a Storage Area Network (SAN) is an example of a storage server. A storage controller operates on behalf of one or more SCSI initiator devices to store and manage data in a set of mass storage devices, such as magnetic or optical storage-based disks or tapes.

To provide such service, the aforementioned storage controller will often be equipped with multiple Fibre Channel ports each with an associated port name. End to end software applications in SAN rely on such port names to ensure proper operation during use of the Storage Controller. One challenge that exists involves situations where the hardware adapters are changed, upgraded, swapped, etc. In such situations, the port names are often altered, thus potentially affecting the ability of the SAN software applications to operate non-disruptively.

There is thus a need for addressing these and/or other issues associated with the prior art.

SUMMARY

A system and method are provided for reassigning port names to ports (e.g. Fibre Channel ports, etc.). This is accomplished by allowing for user involvement during the port name assignment process. By this feature, port names may be assigned and reassigned, as desired, without re-wiring cables or re-configuring storage network so that disruption to host traffic can be minimized. To this end, in various embodiments, the port names are capable of being maintained in a consistent manner after replacement of such hardware, by appropriately reassigning the port names, etc.

In one example of use according to one embodiment, a command interface is displayed for receiving a variety of commands. For example, a display command, edit command, etc. may be received utilizing the command interface. In response to the receipt of the display command, at least one of a plurality of port names (e.g. world wide port names, etc.) assigned to at least one of a plurality of ports may be displayed on the command interface. Further, in response to the receipt of the edit command, at least one of the port names may be reassigned, as desired. In particular, such reassignment may be carried out for conforming a post-replacement port name assignment existing after replacement of a storage system component with a pre-replacement port name assignment existing before the replacement, so that a storage application that relies on the pre-replacement port name assignment continues to operate after the replacement.

In different optional embodiments, booting of a storage controller may be detected such that, in response, the port names may be automatically assigned to the ports. Further, any unassigned port may be identified, so that at least one default port name may be assigned to the unassigned port(s). As an option, the command interface may take the form of a command line interface or any other interface for that matter.

In still additional embodiments, the edit command may take various forms including, but not limited to a set command, a swap command, etc. To this end, the port name reassignment may include setting, swapping, etc. at least one port name. Even still, it may be determined whether the edit command is valid. By this feature, the port name may be conditionally reassigned to a different adapter, based on the determination.

DETAILED DESCRIPTION

A system and method are provided for reassigning port names to ports. This is accomplished by allowing flexible user involvement in the port name assignment process. A command interface is provided for such purpose. By this feature, port names may be assigned and reassigned, for reasons that will soon become apparent, without re-wiring cables or re-configuring storage network so that disruption to host traffic can be minimized.

In one example of use according to one embodiment, the command interface is displayed for receiving a variety of commands. For example, a display command, edit command, etc. may be received utilizing the command interface. In response to the receipt of the display command, a plurality of port names assigned to a plurality of ports may be displayed on the command interface. Further, in response to the receipt of the edit command, at least one of the port names may be reassigned, as desired. In particular, such reassignment may be carried out for conforming a post-replacement port name assignment with a pre-replacement port name assignment.

In the context of the present description, the pre-replacement port name assignment includes one or more port names assigned to one or more storage system components (e.g. hardware adapters, etc.) that exist before replacement of the storage system component(s). Further, the post-replacement port name assignment includes the port name(s) assigned to the storage system component(s) that exists after the replacement of the storage system component(s). By conforming such post-replacement port name assignment with the pre-replacement port name assignment, a storage application that relies on the pre-replacement port name assignment continues to operate properly after the replacement.

As mentioned earlier, end to end software applications rely on port names to ensure proper operation during use of a storage controller. One challenge that exists involves situations where the hardware adapters are changed, upgraded, swapped, etc. In such situations, the port names are often altered, thus potentially affecting the ability of the software applications to operate non-disruptively. To overcome this, in various embodiments, the port names may be maintained in a consistent manner after replacement of such hardware, by appropriately reassigning the port names using the aforementioned command interface, etc. Thus, any application that relies on a port name assignment before a hardware replacement will still work after such replacement without disruption, since the port name may be flexibly reassigned as needed for providing port name consistency in such situation. More information will now be set forth regarding the underlying features with which the foregoing technique is made possible, according to various embodiments.

Figure 1:
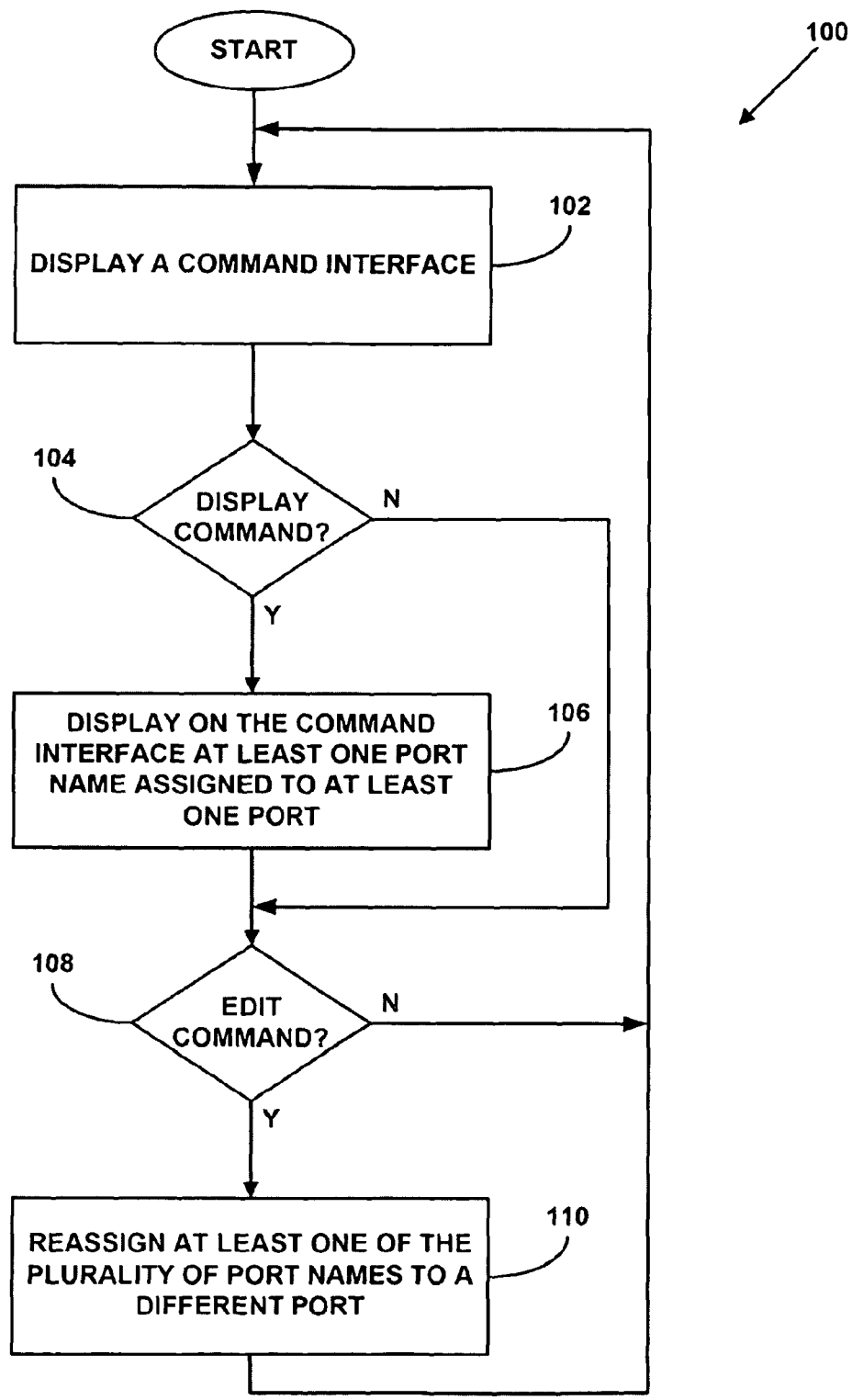
FIG. 1 illustrates a method for reassigning port names to ports, in accordance with one embodiment.

FIG. 1 illustrates a method 100 for reassigning port names to ports, in accordance with one embodiment. In one embodiment, the port may be a Fibre Channel port capable of supporting any desired Fibre Channel topologies including, but not limited to point-to-point, arbitrated loop, and switched fabric, etc.

Still yet, the aforementioned port names, in the present description, refer to any name that may be given to a port on an adapter. In one possible embodiment, the port names may include world wide port names that uniquely correlate with specific Fibre Channel ports. As will soon become apparent, such reassignment of the port names to the ports is carried out utilizing a command interface.

Specifically, as shown in FIG. 1, a command interface is displayed in operation 102. Such command interface refers to any interface that, at the very least, is capable of receiving commands from a user (e.g. administrator, terminal user, any other person, etc.) for reassigning port names to the ports. In one embodiment, the command interface may include a command line interface (CLI), but of course other command interfaces [e.g. graphical user interfaces (GUIs), etc.] are contemplated. Further, the aforementioned commands may include any computer code, signal, etc. that is capable of being received to perform an operation via the command interface.

As further shown, it is determined during use whether a display command is received utilizing the command interface. See decision 104. In response to the receipt of the display command, port names assigned to at least one of the ports are displayed on the command interface. See operation 106. By this feature, the user may review a current port name assignment status for one or more ports.

With continuing reference to FIG. 1, it is also determined whether an edit command is received utilizing the command interface. Note decision 108. In response to the receipt of the edit command, at least one port name is reassigned to a different port, as indicated in operation 110.

In the context of the present description, such edit command may include any command that may effect the aforementioned reassignment. For example, in various embodiments, the edit command may include, but is not limited to a set command (i.e. a command for setting, or defining, a port name), a swap command (i.e. a command for swapping, or switching, two port names), etc. By this design, the user may reassign different port names to different ports. This may, in one embodiment, be useful for maintaining consistent port names event after a replacement of the hardware which may occur for a variety of reasons (e.g. a hardware upgrade, maintenance, etc.). In any case, any executed application that relies on a port name assignment before the hardware replacement will still work after such replacement.

More illustrative information will now be set forth regarding various optional architectures and features of different embodiments with which the foregoing technique may or may not be implemented, per the desires of the user. It should be strongly noted that the following information is set forth for illustrative purposes and should not be construed as limiting in any manner. Any of the following features may be optionally incorporated with or without the other features described.

Figure 2:
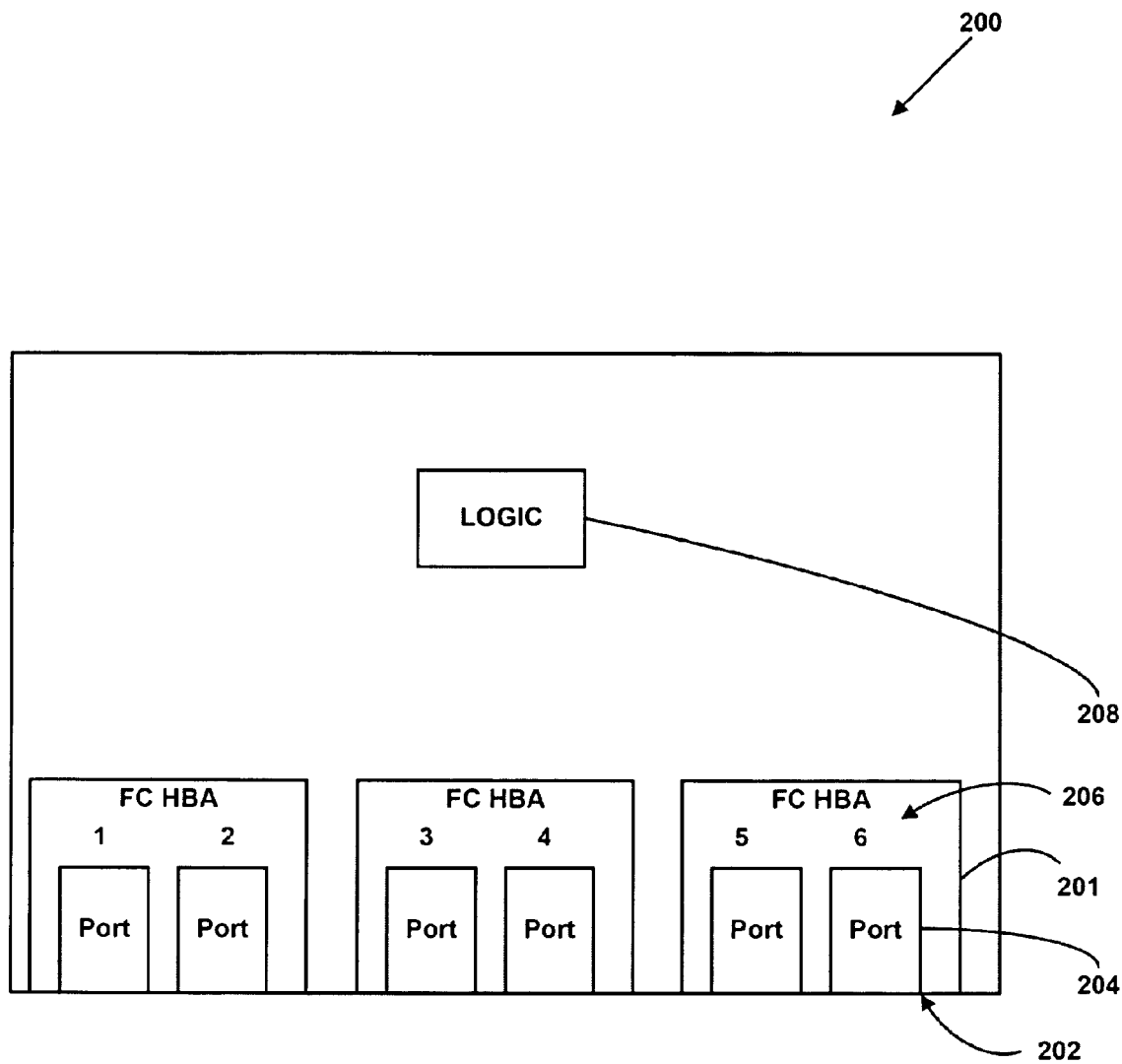
FIG. 2 illustrates a system in which a technique may be used to reassign port names to ports, in accordance with another embodiment.

FIG. 2 illustrates a system 200 in which a technique may be used to reassign port names to ports, in accordance with another embodiment. As an option, the system 200 may be implemented in the context of the framework and/or functionality of FIG. 1. Of course, however, the system 200 may be implemented in any desired environment. It should be noted that the definitions provided above equally apply to the present description.

In one embodiment, the system 200 may include a storage controller, a storage system (e.g. a filer available from NetApp, Inc.), and/or any other system for that matter. More information regarding various system configurations will be set forth during the description of other embodiments illustrated in subsequent figures.

As shown, the system 200 includes a plurality of slots 202 in which Fibre Channel Host Bus Adapter (FC-HBA) system 201 may be inserted. While three (3) adapter systems 201 are shown in FIG. 2 each with two (2) ports 204, it should be noted that any number of such ports/adapter systems 204/201 is contemplated. As further shown, each port 204 has a corresponding port identifier 206.

Further provided is logic 208 for reassigning port names to the various ports of the adapter systems 201. In various embodiments, the logic 208 may include software, hardware, and/or any other type of logic, for that matter.

In use, the logic 208 may reassign the port names under the control of a command interface capable of receiving a variety of commands (e.g. a display command, edit command, etc.). In response to the receipt of a display command, a plurality of port names assigned to the ports 204 may be displayed on the command interface. Further, in response to the receipt of an edit command, at least one of the port names of the ports 204 may be reassigned, as desired. More information will now be set forth regarding one possible data structure adapted for supporting such reassignment, in accordance with a different embodiment.

Figure 3:
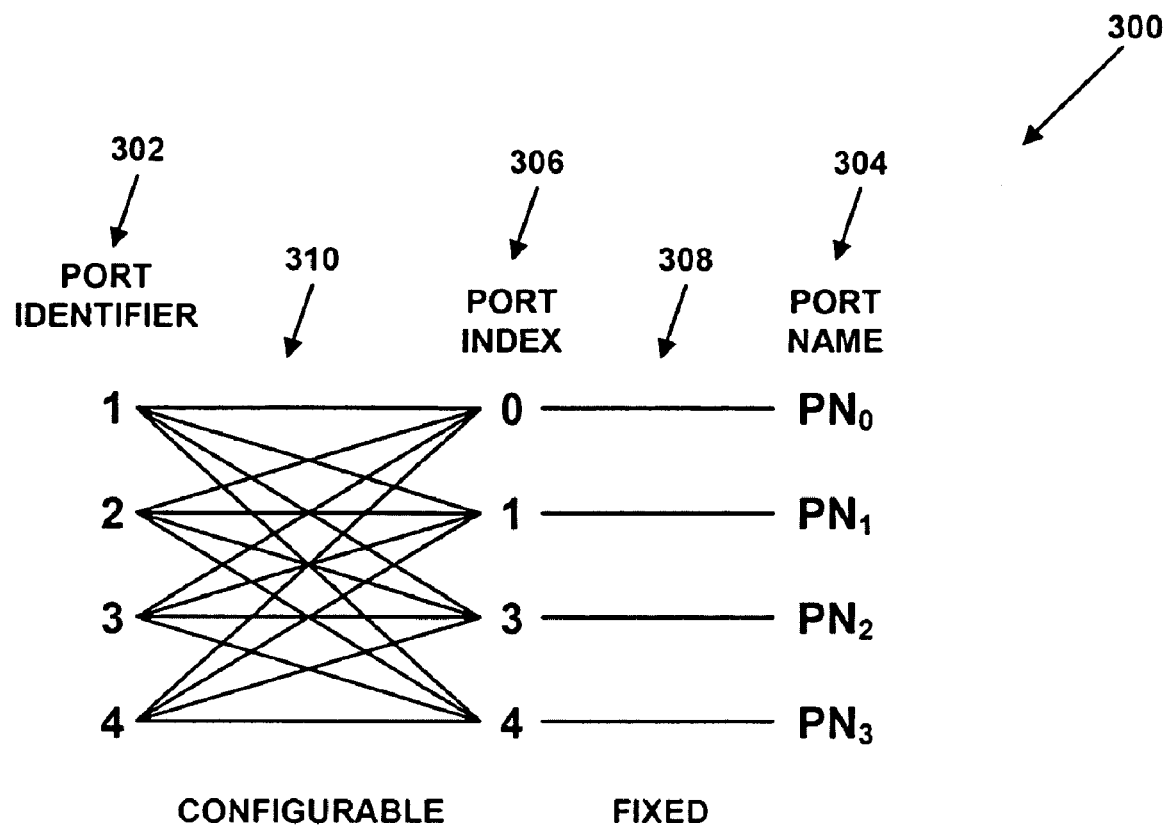
FIG. 3 illustrates a table which may be used to reassign port names to ports, in accordance with another embodiment.

FIG. 3 illustrates a table 300 which may be used to reassign port names to ports, in accordance with another embodiment. As an option, the table 300 may be implemented in the context of the framework and/or functionality of FIGS. 1-2. For example, the table 300 may reside in the system 200 of FIG. 2, and may store port name assignments dictated by the logic 208, during use. Of course, however, the table 300 may be used in any desired environment. Again, the definitions provided above equally apply to the present description.

As shown, a plurality of port identifiers 302 (e.g. port identifiers 206 of FIG. 2) are provided. In one embodiment, such port identifiers 302 may uniquely identify corresponding ports (e.g. ports 204) of a corresponding adapter (e.g. adapter system 201). In one embodiment, the assignment of the port identifiers 302 to the corresponding ports may be fixed. Further, for reasons that will soon become apparent, any hardware (e.g. card adapter, etc.) may take on the port identifier 302 upon the insertion thereof into the associated slot.

Further provided is a plurality of port names 304 and a plurality of port indices 306. In one embodiment, the port names 304 may be visible to the user and/or any executed applications. Further, the port indices 306 may remain less visible (with respect to the port names 304) and used to support the reassignment of the port names 304 to the associated ports.

With continuing reference to FIG. 3, a first mapping 308 between the port names 304 and the port indices 306 is shown to remain fixed. In other words, each port name 304 remains correlated with the associated port index 306 regardless of whether adapter cards are replaced, etc.

However, as further shown, a second mapping 310 is provided between the port indices 306 and the port identifiers 302. Such second mapping 310 is configurable such that the ultimate correspondence between the port names 304 and the port identifiers 302 is flexible. By this design, logic (e.g. logic 208) may use the table 300 to track the assignment of the port names 304, and further reassign the same by adjusting the second mapping 310, as desired. More information will now be set forth regarding a command interface and the user thereof for supporting such reassignment, in accordance with a different embodiment.

Figure 4:
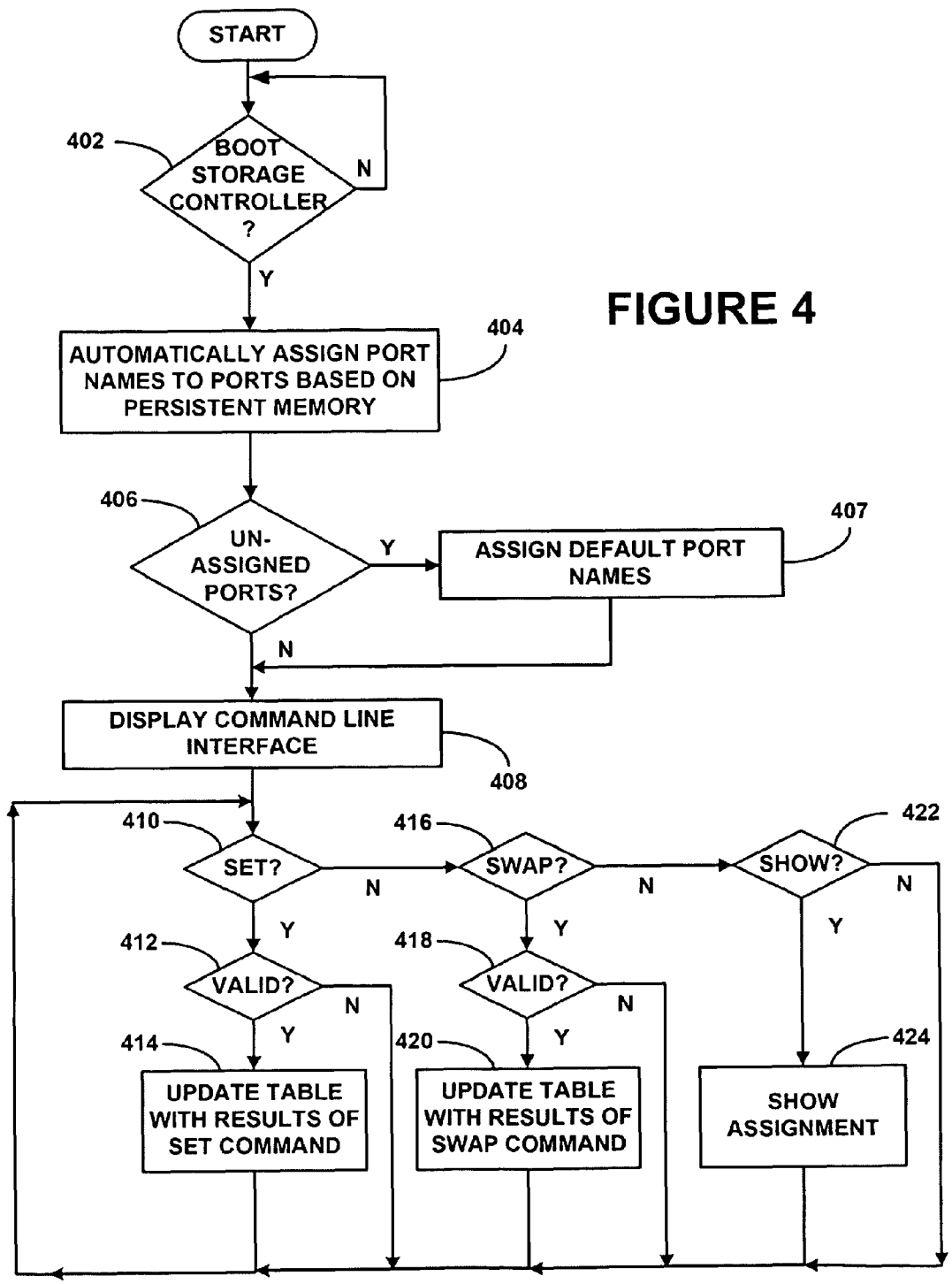
FIG. 4 illustrates a method for reassigning port names to ports using a command interface, in accordance with another embodiment.

FIG. 4 illustrates a method 400 for reassigning port names to ports using a command interface, in accordance with another embodiment. As an option, the method 400 may be implemented in the context of the framework and/or functionality of abovementioned figures. Of course, however, the method 400 may be carried out in any desired environment. Again, the definitions provided above equally apply to the present description.

As shown, the method 400 is initiated with the booting of a storage controller. See decision 402. In response to the detection of a storage controller boot, port names are automatically assigned to any known ports. See operation 404. This may be accomplished using persistent memory. For example, a port name assignment table (e.g. table 300 of FIG. 3) may be stored in such memory (while the storage controller is shut down) in the form of a configuration file or the like, and then used to reestablish such assignment after the storage controller boot.

Further, any unassigned ports are identified in decision 406. Such unassigned ports may, for example, be identified by detecting, after boot-up, any adapters that were not present during previous operation (e.g. before a previous shutdown and the boot-up). Furthermore, decision 406 may, in various embodiments, be carried out by any desired logic (e.g. logic 208 of FIG. 2).

To this end, the unassigned ports may, for example, include ports on the adapters (or components thereof) that were swapped, installed, etc. while the storage controller was shut down (before the boot). If any such unassigned ports are identified per decision 406, default port names may be assigned, as set forth in operation 407. Such default port names may be assigned in any desired manner that is predetermined. For example, a first entry of an available port name list may be selected as the default for a first unassigned port, a second entry of the list may be selected as the default for a second unassigned adapter, and so on.

Next, a command line interface is displayed. See operation 408. In one embodiment, such command line interface may include a prompt allowing for entry of various commands. In various embodiments, such commands may include a show command or an edit command in the form of a set command, a swap command, etc. In another embodiment, the aforementioned edit commands may be accompanied by a target port name or port, as well as new port name or other parameter that renders a change in the port name assignment in association with a particular port.

For example, in the case of the set command, a particular port may be identified (by way of a port identifier), and a desired port name may be provided, such that the port name of the port may be set to the desired port name. Further, in the case of the swap command, at least two particular ports may be identified (by way of their port identifiers), such that the port names of the ports may be swapped. Of course, however, it should be noted that such exemplary commands are set forth for illustrative purposes only and should not be construed as limiting in any manner whatsoever.

As shown, it is determined in decision 410 whether the set command has been received. If so, it is further determined whether the desired change to the port name is valid 412. In one embodiment, this may be accomplished by comparing the desired port name to a list of available port names. In another embodiment, the validation may be accomplished by determining whether the set operation would violate any predefined rule, policy, etc.

If it is found that the desired operation is valid, a tracking table may be updated to reflect the port name reassigned by the set command. See operation 414. For example, mapping between an appropriate port identifier and a port index may be reconfigured to reflect the appropriate correlation between an associated port and a port name.

It may also be determined in decision 416 whether the swap command has been received. If so, it is further determined whether the desired change to the port name is valid 418. Again, this may be accomplished by determining whether the swap operation would violate any predefined rule, policy, etc. If it is found that the swap operation is valid, a tracking table may be updated to reflect the port name reassigned by the swap command, in a manner similar to the set command. See operation 420.

Still yet, it may also be determined in decision 422 whether the show command has been received. If so, a list of current port name assignments may be displayed 424. This list may then be used by a user to determine a current status of the port name assignments, so as to confirm a previous reassignment, determine a need for a reassignment, etc.

By this design, storage administrators may reassign world wide port names to Fibre Channel target ports on a storage controller. To this end, a mechanism is provided for allowing storage administrator involvement in the assignment process. In some embodiments, such reassignment capability may give storage administrators more flexibility in controlling port names, without re-wiring cables or re-configuring storage network, etc.

In one embodiment, the port name assignment may be persistent across a reboot. Further, the port name assignment may be bound to a slot, port, etc. If there is any adapter removed from a storage controller, port names may remain the same on ports of the rest of the adapters. If there is any adapter added, ports on old adapters may still have the same port names, and ports on the new adapter may have the newly assigned port names. If a user just swaps two adapters (dual-port) on two slots, the port names may stay the same for each (slot, port) pair.

By this design, the port names need not necessarily follow the physical adapters. If a user does a storage system component swap, there are two possibilities, according to one embodiment. For example, if the user can put all target adapters into the exact same slots in a new head, then ports of all adapters may have the exact same port names. Further, if the user can not put all the adapters in the same slots (for example, the new head has a different slot count and/or layout from the old head), ports on some or all of the adapters might have different port names assigned to them.

Thus, a predictable and user controllable port name assignment framework is provided. Such framework provides a user with more flexibility in controlling port names in general, and may be especially helpful in the scenarios set forth above.

Figure 5:
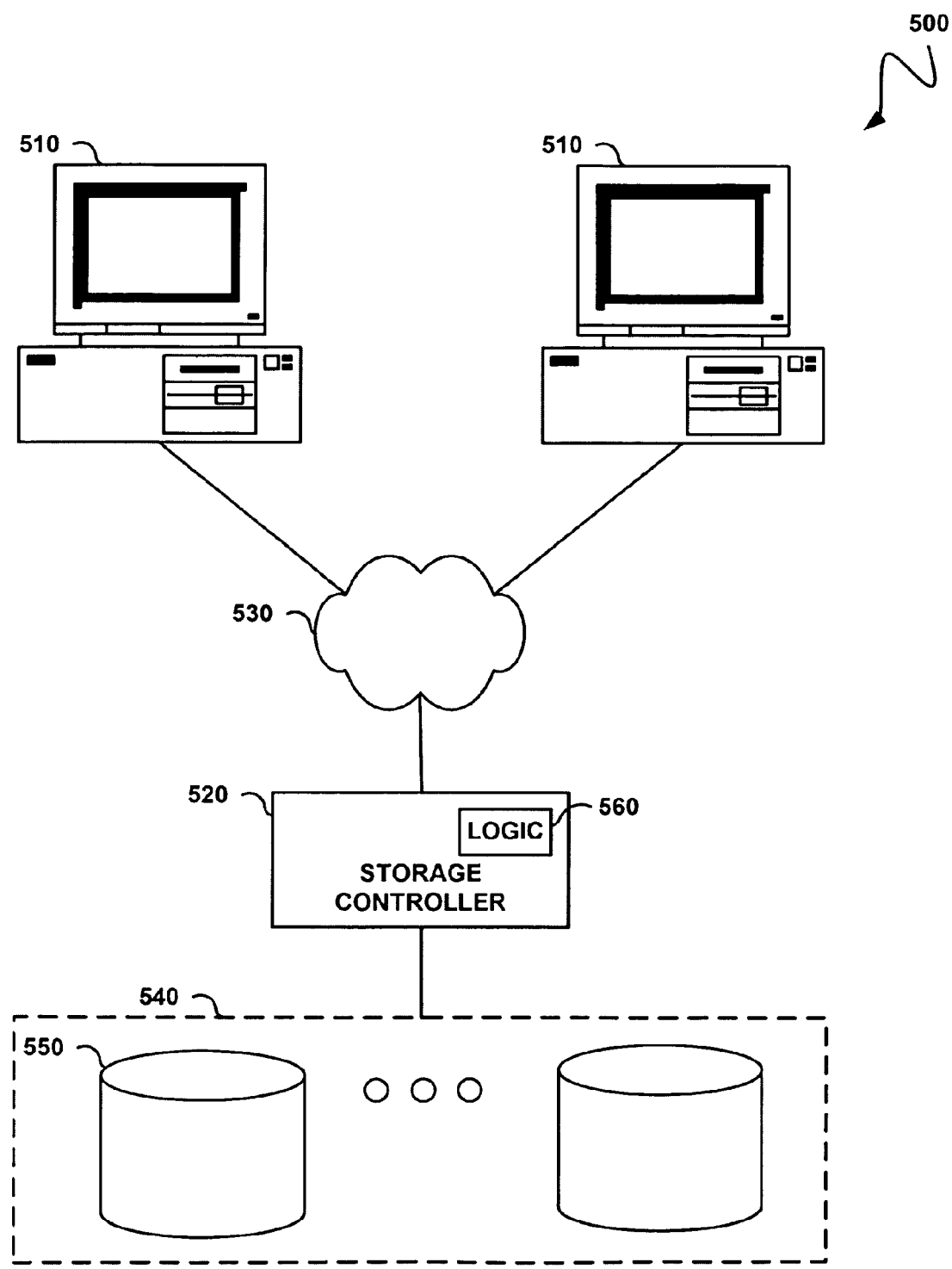
FIG. 5 is an illustration of a network environment in which an embodiment may be implemented.

FIG. 5 is an illustration of a network environment 500 in which an embodiment may be implemented. As an option, the network environment 500 may represent one possible environment in which the system 200 of FIG. 2 may be implemented. Of course, however, it should be noted that the network environment 500 may be used in any desired environment and incorporate any one or more of the features described in the previous figures.

Of course, the various embodiments described herein are not limited to any particular environment, and may be implemented in various storage processes. In the present illustration, the storage system includes a storage server, such as a storage controller 520. The storage controller 520 is coupled with a storage subsystem 540, which includes a set of mass storage devices 550, and to a set of clients 510 through a network 530, such as a storage area network (SAN). Each of the clients 510 may be, for example, a conventional workstation, server, or any of the other example clients set forth earlier.

The storage subsystem 540 is managed by the storage controller 520. For example, the storage controller 520 may receive and respond to various read and write requests from the clients 510, directed to data stored in or to be stored in the storage subsystem 540. The mass storage devices 550 in the storage subsystem 540 may be, for example, magnetic disks, optical disks such as compact disks-read only memory (CD-ROM) or digital versatile/video disks (DVD)-based storage, magneto-optical (MO) storage, tape-based storage, or any other type of non-volatile storage devices suitable for storing large quantities of data.

The storage controller 520 may have a distributed architecture; for example, it may include separate N-module (network module) and D-module (data module) components (not shown). In such an embodiment, the N-module is used to communicate with the clients 510, while the D-module is used to communicate with the storage subsystem 540. In another embodiment, the storage controller 520 may have an integrated architecture, where the network and data components are all contained in a single box or unit. The storage controller 520 further may be coupled through a switching fabric to other similar storage systems (not shown) that have their own local storage subsystems. In this way, all of the storage subsystems can form a single storage pool, to which any client of any of the storage systems has access.

In one embodiment, the storage controller 520 may be equipped with hardware and/or software logic 560 for carrying out the functionality of FIGS. 1-4. While, in the present embodiment, such logic 560 is shown to be a component of the storage controller 520, it should be noted that it may reside elsewhere as well (e.g. exterior of the storage controller 520, etc.).

Figure 6:
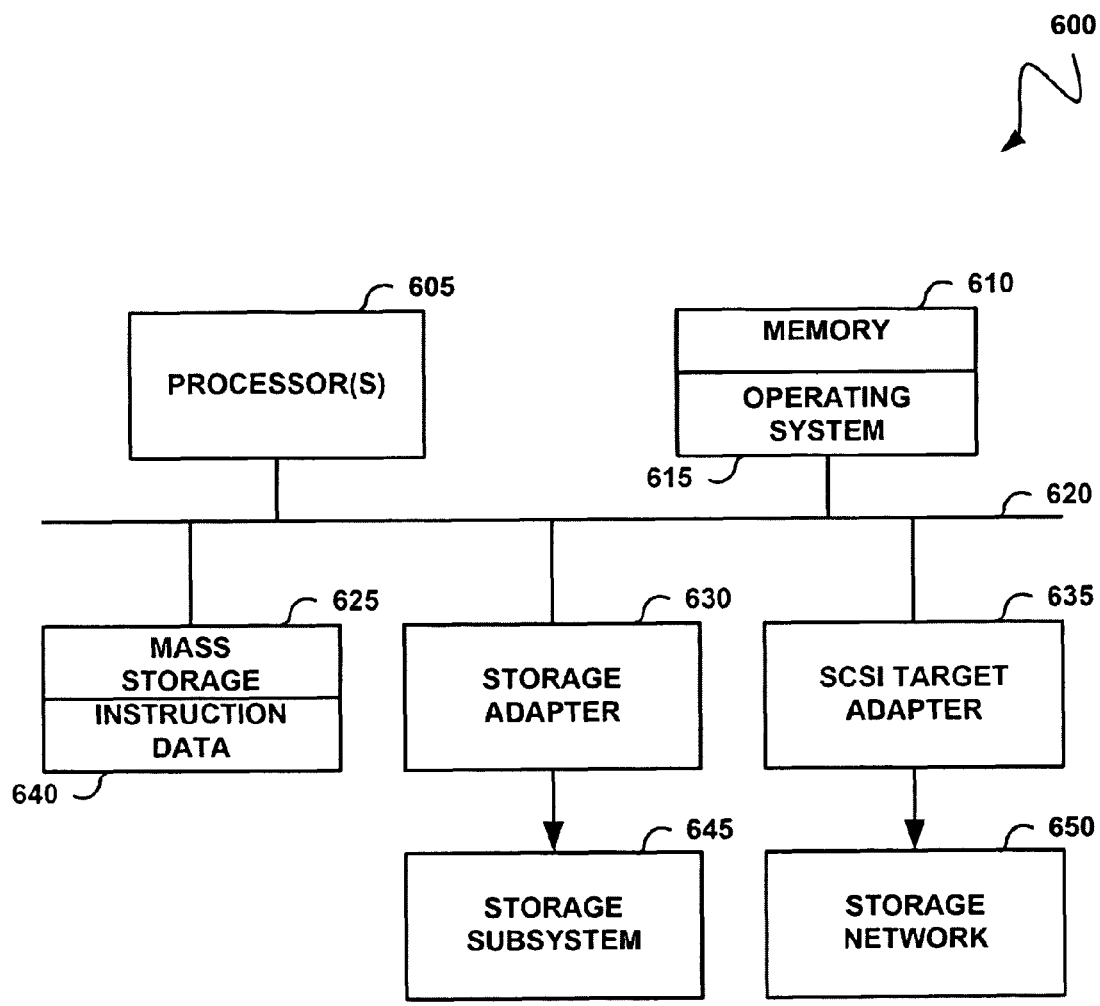
FIG. 6 is a block diagram illustrating architecture of a storage controller that may include an embodiment.

FIG. 6 is a block diagram illustrating architecture of a storage controller 600 that may include an embodiment. In one embodiment, the storage controller 600 may represent the storage controller 520 of FIG. 5. Of course, however, it should be noted that the storage controller 600 may be implemented in any desired environment and incorporate any one or more of the features described in the previous figures.

The storage controller 600 includes one or more processors 605 and memory 610 coupled to a interconnect 620. The interconnect 620 shown in FIG. 6 is an abstraction that represents any one or more separate physical buses, point-to-point connections, or both connected by appropriate bridges, adapters, or controllers. The interconnect 620, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processor(s) 605 may include central processing units (CPUs) of the storage controller 600 and, thus, control the overall operation of the storage controller 600. In certain embodiments, the processor(s) 605 accomplish this by executing software stored in memory 610. The processor(s) 605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 610 is or includes the main memory of the storage controller 600. The memory 610 represents any form of random access memory (RAM), read-only memory (ROM), flash memory, or the like, or a combination of such devices. In use, the memory 610 stores, among other things, the operating system 615 of the storage controller 600.

Also connected to the processor(s) 605 through the interconnect 620 may be one or more internal mass storage devices 625, a storage adapter 630 and a SCSI target adapter 635. The internal mass storage devices 625 may be or include any medium for storing large volumes of instructions and data 640 in a non-volatile manner, such as one or more magnetic or optical-based disks. The storage adapter 630 allows the storage controller 600 to access a storage subsystem 645 and may be, for example, a Fibre Channel adapter or a SCSI adapter.

The SCSI target adapter 635 provides the storage controller 600 with the ability to communicate with remote SCSI initiator devices, such as clients, over a storage network 650.

Figure 7:
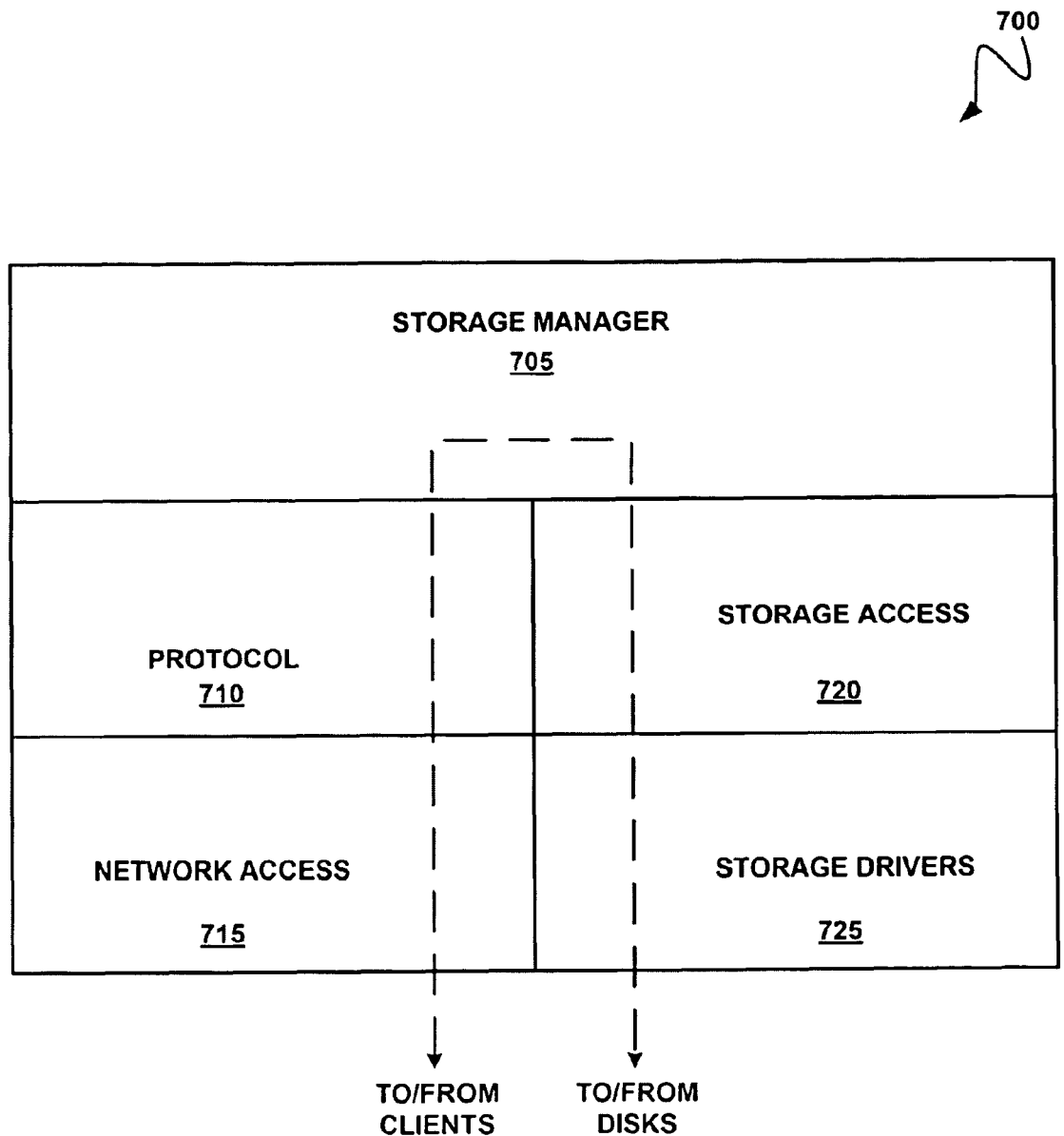
FIG. 7 illustrates an example of an operating system of a storage controller according to one possible embodiment.

FIG. 7 illustrates an example of the operating system 700 of a storage controller according to one possible embodiment. As an option, the operating system 700 may be installed on the storage controller 600 of FIG. 6. Of course, however, it should be noted that the operating system 700 may be used in any desired environment and incorporate any one or more of the features described in the previous figures.

As shown, the operating system 700 includes several modules, or "layers." These layers include a storage manager 705. The storage manager 705 is software that keeps track of the data stored in a storage subsystem and manages read/write operations on the data (i.e. executes read/write operations on the disks in response to client requests).

The operating system 700 also includes a protocol layer 710 and an associated storage network access layer 715, to allow a storage controller to communicate over a storage network to other systems, such as clients. The protocol layer 710 implements one or more of various higher-level network protocols, such as Fibre Channel Protocol for SCSI (SCSI-FCP), Internet Small Computer System Interface (iSCSI), Network File System (NFS), Common Internet File System (CIFS), Hypertext Transfer Protocol (HTTP) and/or Transmission Control Protocol/Internet Protocol (TCP/IP). The network access layer 715 includes one or more drivers, which implement one or more lower-level protocols to communicate over the network, such as Fibre Channel and Ethernet. Interactions between clients and mass storage devices (e.g. disks, etc.) are illustrated schematically as a path, which illustrates the flow of data through the operating system 700.

The operating system 700 further includes a storage access layer 720 and an associated storage driver layer 725 to allow a file server to communicate with a storage subsystem. The storage access layer 720 implements a higher-level disk storage protocol, such as RAID, while the storage driver layer 725 implements a lower-level storage device access protocol, such as Fibre Channel Protocol (FCP) or SCSI. In one embodiment, the storage access layer 720 may implement a RAID protocol, such as RAID-4 or RAID-DP™ (RAID double parity for data protection provided by NetApp, Inc.), and therefore may alternatively be referred to as RAID layer 720.

The foregoing description has set forth only a few of the many possible implementations. For this reason, this detailed description is intended by way of illustration, and not by way of limitations. Variations and modifications of the embodiments disclosed herein may be made based on the description set forth herein, without departing from the scope and spirit of the present application.

It is only the following claims, including all equivalents, that are intended to define the scope of the various embodiments. Moreover, the embodiments described above are specifically contemplated to be used alone as well as in various combinations. Accordingly, other embodiments, variations, and improvements not described herein are not necessarily excluded.

What is claimed is:

1. A method, comprising:
   displaying a command interface;
   receiving a display command utilizing the command interface;
   in response to the receipt of the display command, displaying on the command interface at least one of a plurality of port names assigned to at least one of a plurality of ports;
   receiving an edit command utilizing the command interface; and
   in response to the receipt of the edit command, reassigning at least one of the plurality of port names to a different port, utilizing a hardware processor, for conforming a post-replacement port name assignment existing after replacement of a storage system component with a pre-replacement port name assignment existing before the replacement, so that a storage application that relies on the pre-replacement port name assignment continues to operate after the replacement;
   wherein the at least one of a plurality of port names assigned to the at least one of a plurality of ports is displayed for allowing a user to review a current port name assignment status for the at least one of a plurality of ports wherein the edit command is received from a user utilizing the command interface and is accompanied by a target port and a new port name that renders a change in a port name assignment in association with the target port.

2. The method of claim 1, wherein the ports are Fibre Channel ports.

3. The method of claim 1, and further comprising detecting a boot of a storage controller.

4. The method of claim 3, wherein, in response to the detection of the boot of the storage controller, the port names are automatically assigned to the ports.

5. The method of claim 3, and further comprising identifying at least one unassigned port.

6. The method of claim 5, wherein, in response to the identification of the unassigned port, at least one default port name is assigned to the unassigned port.

7. The method of claim 1, wherein the edit command includes a set command.

8. The method of claim 7, wherein the reassigning includes setting the at least one port name.

9. The method of claim 1, wherein the edit command includes a swap command.

10. The method of claim 9, wherein the reassigning includes swapping the at least one port name.

11. The method of claim 1, and further comprising determining whether the edit command is valid.

12. The method of claim 11, wherein the at least one port name is conditionally reassigned to the different port, based on the determination.

13. The method of claim 1, wherein the port names are capable of being maintained upon a replacement of adapters having the ports.

14. The method of claim 1, wherein the command interface includes a command line interface.

15. The method of claim 1, wherein the port names include world wide port names.

16. A system, comprising:
    a plurality of ports; and
    a hardware processor for presenting a graphical user interface for displaying a command interface, the command interface for:
       receiving a display command utilizing the command interface;
       in response to the receipt of the display command, displaying on the command interface at least one of a plurality of port names assigned to at least one of the ports;
       receiving an edit command utilizing the command interface; and
       in response to the receipt of the edit command, reassigning at least one of the plurality of port names, for conforming a post-replacement port name assignment existing after replacement of a storage system component with a pre-replacement port name assignment existing before the replacement, so that a storage application that relies on the pre-replacement port name assignment continues to operate after the replacement;
    wherein the command interface is operable such that the at least one of a plurality of port names assigned to the at least one of a plurality of ports is displayed for allowing a user to review a current port name assignment status for the at least one of a plurality of ports wherein the edit command is received from a user utilizing the command interface and is accompanied by a target port and a new port name that renders a change in a port name assignment in association with the target port.

17. A non-transitory computer readable medium embodying a computer program product, comprising:
    computer code for displaying a command interface;
    computer code for receiving a display command utilizing the command interface;
    computer code for displaying on the command interface at least one of a plurality of port names assigned to at least one of a plurality of ports, in response to the receipt of the display command;
    computer code for receiving an edit command utilizing the command interface; and
    computer code for reassigning at least one of the plurality of port names to a different port, in response to the receipt of the edit command, for conforming a post-replacement port name assignment existing after replacement of a storage system component with a pre-replacement port name assignment existing before the replacement, so that a storage application that relies on the pre-replacement port name assignment continues to operate after the replacement;

wherein the computer program product is operable such that the at least one of a plurality of port names assigned to the at least one of a plurality of ports is displayed for allowing a user to review a current port name assignment status for the at least one of a plurality of ports wherein the edit command is received from a user utilizing the command interface and is accompanied by a target port and a new port name that renders a change in a port name assignment in association with the target port.

18. The computer program product of claim 17, wherein the ports are Fibre Channel ports.

19. The computer program product of claim 17, wherein the command interface includes a command line interface.

20. The computer program product of claim 17, wherein the port names include world wide port names.

* * * * *